June 18, 1940.  L. F. BAASH  2,204,646
BUSHING FOR USE IN ROTARY TABLES
Filed Dec. 17, 1938  2 Sheets-Sheet 1
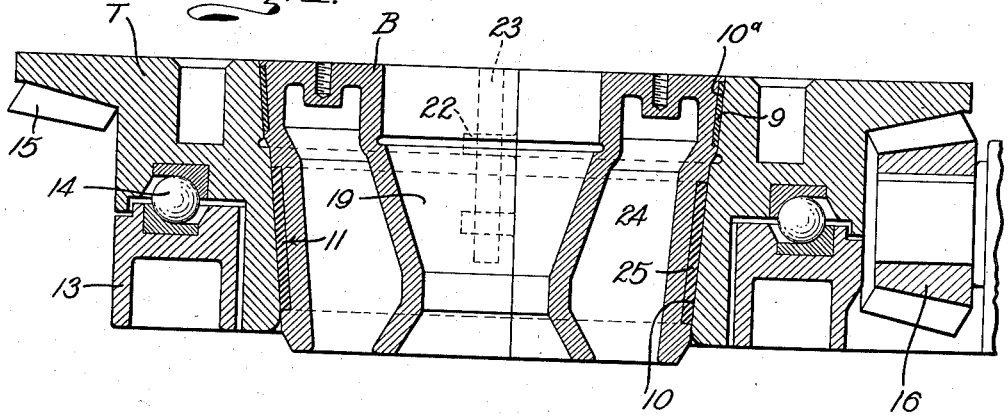
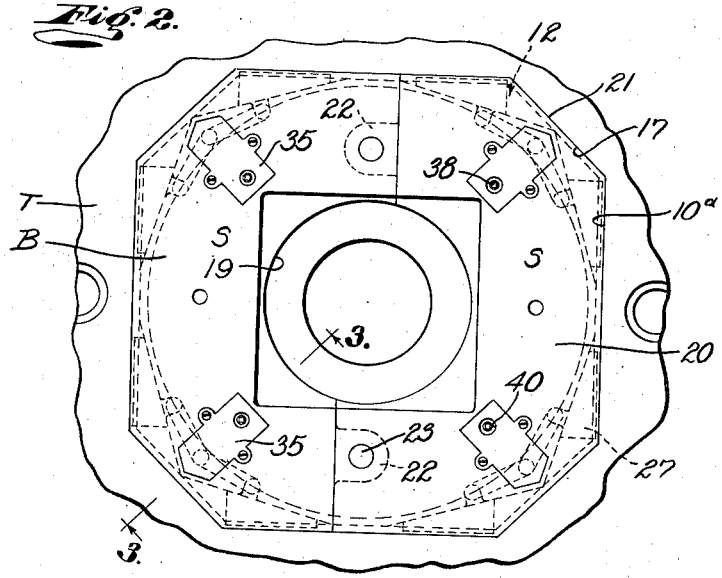
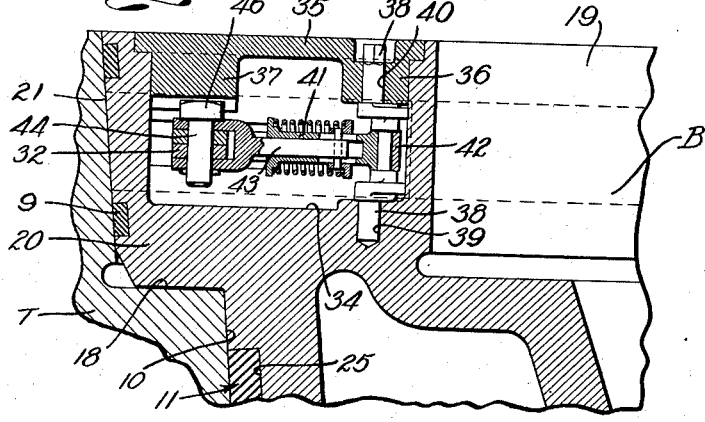
Inventor
LAWRENCE F. BAASH
By
His Attorney June 18, 1940.  L. F. BAASH  2,204,646
BUSHING FOR USE IN ROTARY TABLES
Filed Dec. 17, 1938  2 Sheets-Sheet 2
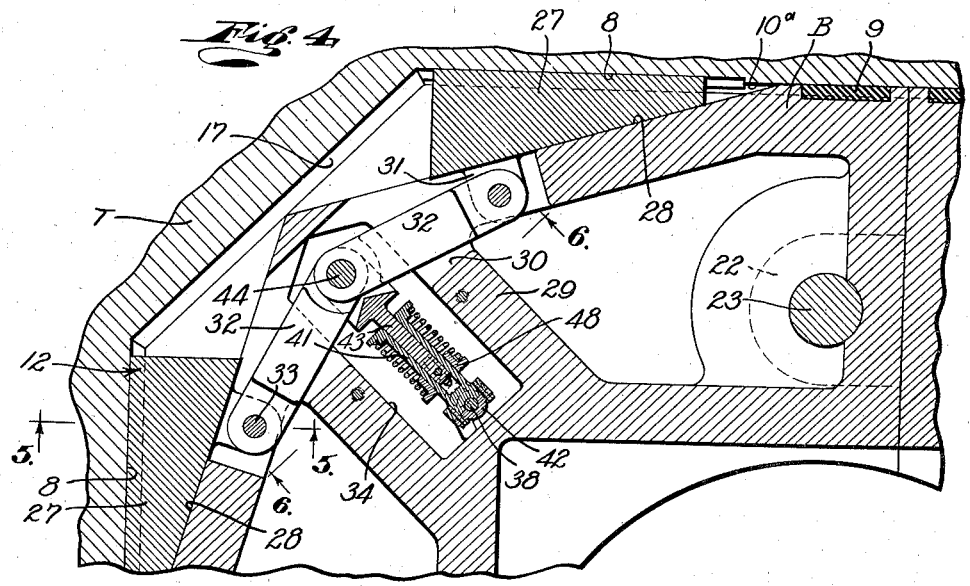
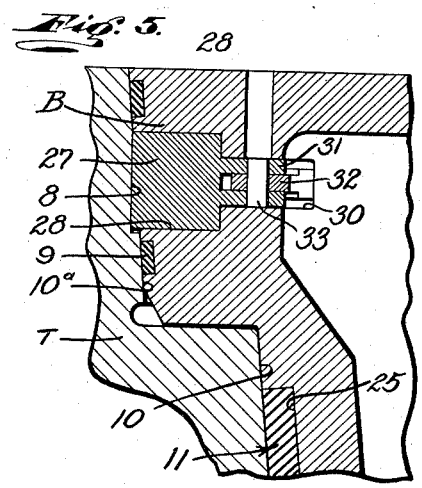
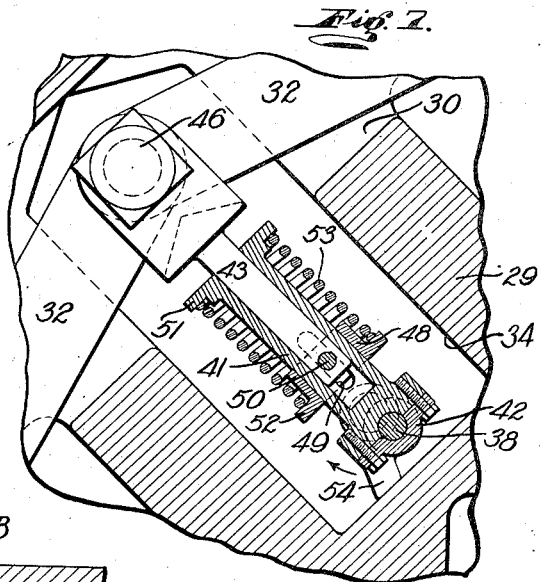
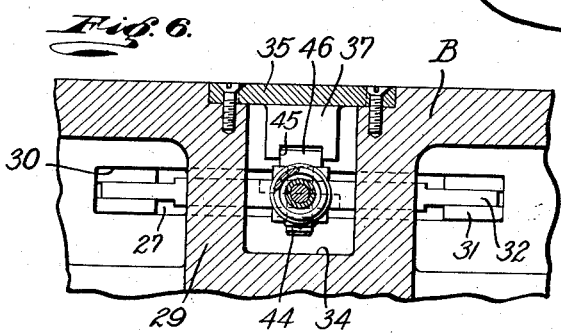
Inventor
LAWRENCE F. BAASH
By
His Attorney Patented June 18, 1940

2,204,646

UNITED STATES PATENT OFFICE 2,204,646

BUSHING FOR USE IN ROTARY TABLES

Lawrence F. Baash, Los Angeles, Calif., assignor to Baash-Ross Tool Company, Los Angeles, Calif., a corporation of California Application December 17, 1938, Serial No. 246,425

11 Claims. (Cl. 255—23)

This invention relates to well drilling equipment and relates more particularly to the bushings employed in the rotary tables of well drilling units or rigs. A general object of this invention is to provide a simple practical and effective bushing that will remain tight and immovable in the opening of a rotary table.

In the drilling of a well with the rotary method of well drilling the string of drill pipe is rotated by what is known as a rotary. The rotary usually embodies a rotary table rotatable about a vertical axis and having a central vertical opening carrying a master bushing. The master bushing in turn carries a drive bushing that transmits the rotation of the table to a polygonal drive stem on the upper end of the string of drill pipe. The rotary table and the bushings carried thereby are subjected to severe shocks and heavy torsional forces during the drilling operations which often cause the master bushing to work or move in the rotary table, resulting in wear of the contacting surfaces of the table and bushing. This wearing of the engaging surfaces of the table and master bushing soon creates excessive looseness of the bushing in the opening of the table.

Another object of this invention is to provide a master bushing that remains tight and secure in the opening of the rotary table thereby eliminating wear of the contacting table and bushing surfaces. The accurate and secure fit of the bushing in the table also assures the correct and accurate fit of the slips and drive bushing sections in the master bushing.

Another object of this invention is to provide a master bushing of the character mentioned in which the means for holding the bushing tight in the opening of the table automatically compensates for irregularities and wear of the opening in the table and holds the bushing firmly in the opening throughout the period of use of the bushing.

Another object of this invention is to provide a master bushing that embodies a multiplicity of novel toggle means having wedges engaging with the walls of the rotary table opening to effectively hold the bushing against slap and play in the opening.

Another object of this invention is to provide a bushing of the character mentioned in which the wedges of the toggle means are actuated by spring loaded toggles to at all times remain effective and active.

Another object of this invention is to provide a bushing of the character mentioned in which the toggle means or wedge means are readily releasable or retractable to provide for the easy insertion of the bushing in the table opening and the ready removal of the bushing from the table.

Another object of this invention is to provide a combination of a rotary table and a master bushing of novel and improved design and construction in which the bushing tends to remain firm and immovable in the opening of the table.

A further object of this invention is to provide a combination of the character just referred to in which the bushing has tapered parts received in tapered portions of the table opening and provided with cushioning wear taking sheaths of rubber, or the like, to maintain the bushing tight in the table and to absorb slap and play.

The various objects and features of my invention will be fully understood from the following detailed description of a typical preferred form and application of the invention, throughout which description reference is made to the accompanying drawings, in which:

Fig. 1 is a central vertical detailed sectional view of the improved table and master bushing of the present invention. Fig. 2 is a fragmentary top or plan view of the table with the bushing therein. Fig. 3 is an enlarged fragmentary vertical detailed sectional view taken as indicated by line 3—3 on Fig. 2. Fig. 4 is a fragmentary horizontal detailed sectional view illustrating one of the wedge means and the adjacent parts of the table and bushing. Figs. 5 and 6 are fragmentary vertical detailed sectional views taken as indicated by lines 5—5 and 6—6, respectively, on Fig. 4, and Fig. 7 is an enlarged fragmentary detailed sectional view illustrating the crank and spring mechanism of one of the wedge means.

The embodiment of the present invention illustrated in the drawings may be said to comprise, generally, a rotary table T having an opening 10, a master bushing B seated in the opening 10, a cushioning wear-taking sheath 11 on the bushing B for bearing on the walls of the opening 10 and a plurality of circumferentially spaced wedge means 12 carried by the bushing B and coperating with the wall of the opening 10 to hold the bushing tight in the opening.

The rotary table T is adapted to be arranged or mounted at the upper end of the well and is supported for rotation about a vertical axis. In the case illustrated in the drawings the table T is supported on a base 13 by a suitable bearing 14. Ring gear teeth 15 are provided on the under side of the table T and a driven bevel gear 16 meshes with the teeth 15 to drive or rotate the table T. In accordance with the usual practice the top of the table T is flat and horizontal.

The opening 10 of the rotary table T is provided to receive and carry the bushing B. The opening 10 extends centrally and vertically through the table T and is preferably quite large. In accordance with the invention the opening 10 is of special or characteristic shape to cooperate with the improved bushing B of the invention. The upper portion 10ª of the opening 10 is polygonal or generally square in horizontal cross section having four major side walls in perpendicular relation to one another. Angular or diagonal corner walls 17 extend between and connect the adjacent major walls of the polygonal portion 10ª of the opening 10. The walls of the poygonal portion 10ª of the table opening 10 are preferably inclined or tapered downwardly and inwardly. An upwardly facing shoulder 18 is provided on the wall of the table opening 10 at the lower end of its polygonal portion 10ª. The lower portion or major portion of the opening 10 is round in cross section and is tapered having a wall that slopes downwardly and inwardly relative to the central vertical axis of the table T. The major tapered or inclined wall of the opening 10 may extend from the shoulder 18 to the lower end of the table T.

The bushing B is shaped and proportioned to fit in the opening 10 of the table T and is adapted to carry a drive bushing, slips and other equipment (not shown). The bushing B has a central vertical opening 19 for receiving the drive bushing, slips, etc. The opening 19 may have a polygonal upper portion and its wall may taper downwardly and inwardly from the polygonal portion, as shown. The upper end of the bushing B is preferably flat and is adapted to lie substantially flush with the top of the table T. The bushing B is provided with what I will term a head 20. The head 20 of the bushing B is generally square in horizontal cross section to occupy the polygonal portion 10ª of the opening 10. The head 20 has diagonal corners 21 to oppose the diagonal walls 17 of the opening portion 10ª. As illustrated throughout the drawings, the head 20 of the bushing B is tapered or provided with downwardly and inwardly inclined surfaces to fit in the polygonal portion 10ª of the opening 10. The lower side of the head 20 is flat and horizontal and opposes the shoulder 18. The major lower portion of the bushing B extending downwardly from the head 20 has a conical or downwardly and inwardly tapered exterior to be received in the tapered opening 10. In accordance with the invention the bushing B is machined to accurately fit the opening 10 with only sufficient tolerance or clearance to allow the insertion of the bushing in the opening.

It may be preferred to make the bushing B sectional to be more readily handled. As illustrated in the drawings the bushing B is divided into two like or complementary sections S. A pair of vertically spaced lugs 22 projects from the inner side of each bushing section A. The lugs 22 are received in suitable sockets in the opposing surfaces of the sections and pins 23 are passed through openings in the bushing sections S and the lugs 22 to connect the two sections for handling as a unit. The two sections S of the bushing B are cored to have chambers 24 between their inner and outer wall parts.

The cushioning sheath 11 is provided on the bushing B to cooperate with the wall of the tapered opening 10 to absorb and cushion shock and slap, to take the wear and to assist in holding the bushing tight in the opening. The sheath 11 is provided on the major lower portion of the bushing B to bear on the wall of the tapered or conical portion of the opening 10. The cushioning sheath 11 is formed of rubber or rubber composition and is flexible, resilient and compressible. In the preferred construction the sheath 11 is of substantial width or vertical extent and encircles or surrounds the bushing B to have extensive engagement in the opening 10. It is preferred to secure the sheath 11 in a recess 25 in the tapered periphery of the bushing B. The sheath 11 may be secured in the recess 25 by vulcanizing or by any other method. In accordance with the invention the sheath 11 is initially proportioned to project from or beyond the tapered periphery of the bushing B. When the bushing B is seated in the opening 10 the projecting sheath 11 is compressed through cooperation with the wall of the opening so that the tapered periphery of the bushing contacts or is in close proximity to the tapered wall of the opening 10. The compressible resilient sheath 11 encircling the tapered portion of the bushing B and seated in the tapered opening 10 effectively cushions shock and slap and wedges in the opening to effectively resist or prevent movement of the bushing B in the opening 10 of the table T. Where the bushing B is divided into two sections S, as illustrated, the sheath 11 is similarly divided to have a portion on each bushing section S.

As illustrated, the head 20 of the bushing B is provided with cushioning and wear taking inserts 9 of rubber, rubber composition, or the like. The inserts 9 cooperate with the walls of the polygonal portion 10ª of the table opening. The inserts 9 are set and secured in recesses or windows in the head 20 and are formed of a material that is resistant to oil, etc. The inserts 9 initially project from the head 20 and when the bushing B is seated in the table T the inserts are compressed against the walls of the opening portion 10ª to take the wear and cushion shock and slap.

The means 12 are provided to hold the bushing B tight in the opening 10 of the rotary table T so that the bushing cannot work, slap or move in the table. In the preferred form of the invention the means 12 are carried by the bushing B to cooperate with the table T. It is preferred to provide a plurality of substantially equally spaced means 12 on the bushing B. In practice there may be a means 12 provided in each corner portion of the polygonal head 20 of the bushing B. The several means 12 may be identical and I will proceed with a detailed description of one means 12, it being understood that such description is equally applicable to the other means 12.

Each means 12 includes a pair of wedges 27. The wedges 27 are alike and are arranged in horizontal guideways or grooves 28 in the flat sides of the polygonal head 20. The grooves 28 extend outwardly in opposite directions from a diagonal corner 21 of the head 20 and have flat upper and lower walls. The inner walls of the grooves 28 are pitched so that the grooves are of outwardly diminishing depth. The wedges 27 are shiftable longitudinally in the grooves 28 and have pitched inner sides slidable on the pitched inner walls of the grooves. The outer sides of the wedges 27 are flat and vertical to engage flat vertical machined faces 8 on the polygonal portion 10ª of the table opening 10. It will be observed that the two wedges 27 of a means 12 bear outwardly against faces 8 on two adjacent major walls of the polygonal portion 10a of the opening 10.

A boss or web 29 extends through the head 20 from each diagonal corner 21 to the inner wall portion of the bushing. A transverse slot 30 extends through each web 29 and the adjacent parts of the bushing B and has its end portions in communication with the adjacent wedge carrying grooves 28. Bifurcated lugs 31 are provided on the rear sides of the wedges 27 and are received in the slot 30. Toggle links 32 are arranged in the slot 30 and have their outer end portions received in the bifurcated lugs 31. Pins 33 are arranged through openings in the lugs 31 and the links 32 to pivotally connect the links with the wedges 27. The links 32 extend inwardly toward one another and have lapped inner parts of reduced thickness.

An effective spring loaded crank means is provided to act on the toggle links 32 to urge the wedges 27 outwardly so that they bear against the internal faces 8 of the table T to hold the bushing B tight in the table. A socket 34 enters the bushing B from its upper end and joins the slot 30. The socket 34 is provided to contain or house the crank means. A plate 35 closes the upper end of the socket 34 and has two spaced downwardly projecting bosses 36 and 37. A crank 38 is arranged in the inner portion of the socket 34. The lower portion of the crank 38 is turnable in an opening 39 in the web 29 while the upper portion of the crank 38 is turnable in a vertical opening 40 in the boss 36. The upper portion of the opening 40 is enlarged in diameter and the crank 38 has a polygonal upper end portion accessible in the enlarged portion of the opening 40. This polygonal part of the crank 38 may be engaged by a key or socket wrench to turn the crank.

The intermediate portion of the crank 38 is within the socket 34 and is eccentric relative to the upper and lower portions of the crank. A tubular crank rod 41 has a bearing 42 turnable on the eccentric intermediate portion of the crank 38. The rod 41 extends outwardly in the socket 34. A stem 43 is slidable in the tubular rod 41 and extends outwardly from the rod for connection with the toggle links 32. The outer end of the stem 43 is bifurcated to receive the lapped ends of the links 32. A pin 44 is arranged through openings in the bifurcated end of the stem 43 and the lapped portions of the links 32 to pivotally connect the stem with the links. A slot 45 is provided in the lower side of the boss 37 and the pin 44 has a polygonal or square head 46 slidable in the slot 45 to maintain the stem 43 centralized and to assure like or uniform movement of the two wedges 27.

A spring couple or spring connection is provided between the relatively shiftable rod 41 and stem 43. This connection includes a sleeve 48 surrounding and shiftable on the rod 41. A longitudinal slot 49 is provided in the rod 41. A pin 50 is carried by the sleeve 48 and passes through the slot 49 and an opening in the stem 43 to connect the sleeve with the stem. The outer end of the rod 41 is provided with a radial flange 51 and a similar radial flange 52 is provided on the sleeve 48. A helical compression spring 53 surrounds the sleeve 48 and a portion of the rod 41 and has its ends engaging the opposing flanges 51 and 52. When the spring 53 is under compression between the flanges 51 and 52 it acts to urge the stem 43 inwardly and thus urges the links 32 toward an in-line position and therefore urges the wedges 27 outwardly in the grooves 28.

When the crank 38 is in the position illustrated in the drawings with its eccentric portion thrown over center toward the vertical center of the bushing B the spring 53 is under compression between the flanges 51 and 52 and exerts a substantial force on the toggle links 32 to urge the wedges 27 outwardly in the grooves 28. Thus the spring 53 may normally operate to urge the wedges 27 to positions where they hold the bushing B tight in the opening 10 of the table T. Stops 54 are provided on the crank 38 to limit pivoting of the crank in one direction and to maintain the crank in the position illustrated in the drawings where its eccentric is thrown over center in the general direction toward the vertical axis of the bushing B. When the crank 38 is turned in the direction indicated by the arrow in Fig. 7 the spring 53 momentarily tends to hold the stem 43 against movement and as the turning of the crank continues the bottom of the opening 60 in the rod 41 engages the inner end of the stem 43 so that the movement of the rod is transmitted to the stem. This outward movement of the stem 43 increases the angle between the toggle links 32 and effects retraction of the wedges 27. It is to be observed that the wedges 27 form extensions of the novel toggle means for holding the bushing B tight in the table T.

It is believed that the utility and practicability of the improved equipment of the present invention will be readily understood from the foregoing detailed description. When the bushing B is seated in the table T the cushioning sheath 11 bearing in the tapered opening 10 and the inserts 9 bearing in the opening portion 10a are effective in absorbing shock and slap and hold or assist in holding the bushing B against movement and play in the table. When the means 12 are to be set or actuated the polygonal upper end portions of the cranks 38 are turned in the direction counter to the arrow in Fig. 7 until their eccentric portions are thrown over center to positions such as illustrated in the drawings with the stops 54 against the walls of the socket 34. During this turning of a crank 38 the rod 41 associated therewith is drawn or moved inwardly with respect to the vertical center of the bushing and the flange 51 on the rod compresses the spring 53 against the flange 52. The spring 53 is thus put under compression and operates to transmit movement and force from the rod 41 to the stem 43. The stem 43 in turn moves the toggle links 32 toward their in-line positions and the links move the wedges 27 outwardly in their respective grooves 28. The springs 53 of the means 12 are held under compression so long as the cranks 38 remain in the positions just described, and the springs thus operate to maintain an outward force on the related wedges 27.

The spring-urged wedges 27 acting or bearing between opposing surfaces of the bushing B and the table T operate to maintain the bushing tight in the table. The sets or pairs of spring-urged toggle actuated wedges 27 are spaced about the exterior or circumference of the bushing B to dependably and effectively hold the bushing against all play and movement in the table T and prevent relative movement between the sections S. When it is desired to remove the bushing B from the table T the cranks 38 are turned in the direction indicated by the arrow in Fig. 7. As described above, this turning of the cranks 38 relieves the compression from the springs 37 and then effects outward movement of the stems 43. Outward movement of the stems 43 is accompanied by pivoting of the toggle links 32 and retraction of the wedges 27. The wedges 27 may retract to positions where there do not interfere with the removal of the bushing from the table T.

Having described only a typical preferred form and application of my invention I do not wish to be limited or restricted to the specific details herein set forth, but wish to reserve to myself any variations or modifications that may appear to those skilled in the art or fall within the scope of the following claims:

Having described my invention, I claim:

1. In combination, a rotary table having a vertical opening whose upper portion is polygonal and tapered and whose lower portion is tapered and round in cross section, and a master bushing arranged in the table having a tapered polygonal upper portion received in the polygonal portion of said opening and a tapered portion round in cross section received in the lower portion of said opening, the master bushing including a resilient cushioning sheath on its tapered lower portion bearing on the wall of the tapered lower portion of said opening.

2. In combination, a rotary table having a vertical opening, said opening having a downwardly and inwardly tapered wall, a master bushing in said opening having a downwardly and inwardly tapered external surface, and a compressible resilient element compressed between said wall and surface to take wear and to hold the bushing tight in the opening.

3. A master bushing for use in a rotary table having an opening comprising a bushing body to be arranged in the opening, and a play absorbing rubber sheath on the body to bear in the opening.

4. A bushing for use in the opening of a rotary table comprising a bushing body to seat in the opening, and means carried by the body to engage the wall of the opening to hold the body tight in the opening, said means including sets of wedge elements for bearing against the wall of said opening, and toggle means connected between the wedge elements of said sets for operating the wedge elements.

5. A bushing for use in the opening of a rotary table comprising bushing body sections, and means for holding the sections tight in the opening comprising spring urged members carried by the sections for engaging the wall of the opening.

6. A bushing for use in the opening of a rotary table comprising a bushing body to seat in the opening, and spaced means carried by the bushing body for holding the body tight in the opening, each of said means including a pair of shiftable wedges for engaging the wall of the opening, and pivotally connected toggle links connected between the wedges for actuating the wedges.

7. A bushing for use in the opening of a rotary table comprising a bushing body to seat in the opening, and spaced means carried by the bushing body for holding the body tight in the opening, each of said means including a pair of shiftable elements for engaging the wall of the opening, pivotally connected toggle links connecting the elements, and a crank acting on the links to actuate the same.

8. A bushing for use in the opening of a rotary table comprising a bushing body to seat in the opening, and spaced means carried by the bushing body for holding the body tight in the opening, each of said means including a pair of shiftable wedges for engaging the wall of the opening, toggle links connected with the wedges, an actuating crank, and spring means for transmitting movement from the crank to the links.

9. A bushing for use in the opening of a rotary table comprising bushing body sections, and means for holding the sections tight in the opening comprising pitched faces on the sections, wedges shiftable on the faces for engaging the wall of the opening, and toggle means for actuating the wedges along the faces.

10. A master bushing for use in a rotary table having an opening with a polygonal upper portion and a tapered portion below the polygonal portion, the bushing comprising a body having a polygonal head for arrangement in the polygonal portion of the opening and a tapered part below the head to extend into the tapered portion of the opening, a rubber sheath on said tapered part bearing in the tapered portion of the opening, and means carried by the head and engaging the wall of the opening to hold the body against movement therein.

11. In a bushing for arrangement in the flat walled opening of a rotary table, a bushing body adapted to seat in the opening of the table, a wedge adapted to engage between a wall of the opening and the body to hold the body tight in the opening, and toggle means for actuating the wedge.

LAWRENCE F. BAASH.